May 22, 1951  S. A. HASTINGS ET AL  2,554,406

ROTARY FLUID SEAL WITH "O" RING

Filed Dec. 13, 1946

INVENTORS
Shirrel A. Hastings
James H. Thayer
BY
Charles P. Vytlich
atty.

Patented May 22, 1951

2,554,406

UNITED STATES PATENT OFFICE 2,554,406

ROTARY FLUID SEAL WITH "O" RING

Shirrel A. Hastings and James H. Thayer, Chicago, Ill., assignors to Crane Packing Company, Chicago, Ill., a corporation of Illinois Application December 13, 1946, Serial No. 715,974

2 Claims. (Cl. 286—11.15)

This invention relates to fluid seal devices of the type used to effect a seal between relatively rotatable machine elements, the devices utilizing radially disposed surfaces to effect the seal. More specifically, this invention relates to a rotary seal of this general character which utilizes as the flexible deformable sealing element thereof an endless ring having a circular radial cross-section, commonly known as an O ring.

In a copending application of Charles F. Voytech, Serial No. 715,973, filed December 13, 1946, there is disclosed a rotary seal which is sufficiently compact to fit into the standard spaces for which shaft-gripping seals have been designed. The Voytech seal is disclosed as a pressed-in type of seal, that is to say, the seal is installed by pressing the seal into a suitable opening or recess in one of the relatively rotatable machine elements and requires the use of an arbor press to effect such installation which entails a certain amount of risk of damaging the sealing washer. A special operation must be used to press the seal into place which adds to the cost of the installation and also renders it difficult to remove the seal should a replacement be required.

The principal object of this invention is to provide an improved seal which is sufficiently compact to be interchangeable with the commonly used shaft-gripping seals, but which may be installed in a machine merely by dropping the seal into a recess and exerting no more pressure than is available in a hand operation.

The improved seal is shown in the accompanying drawings, in which

Figure 1:
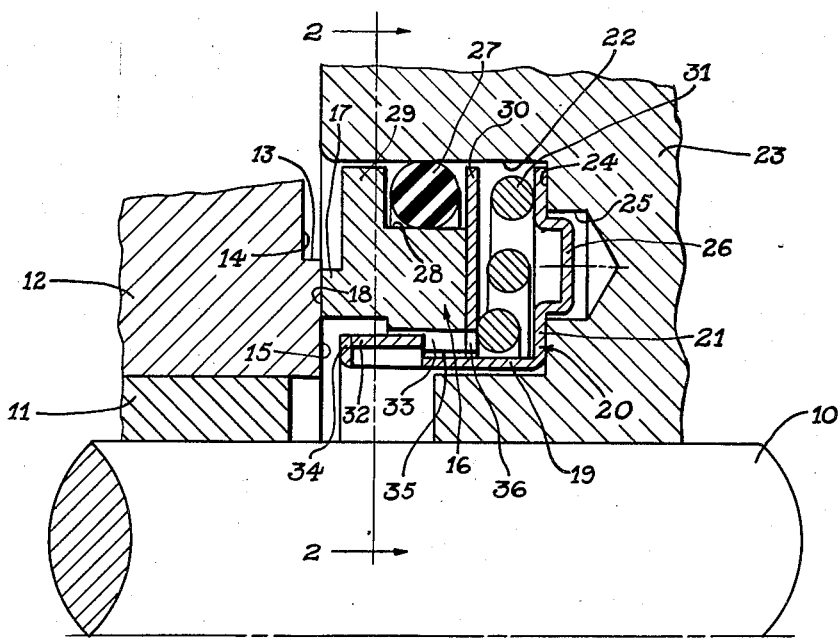
Figure 2:
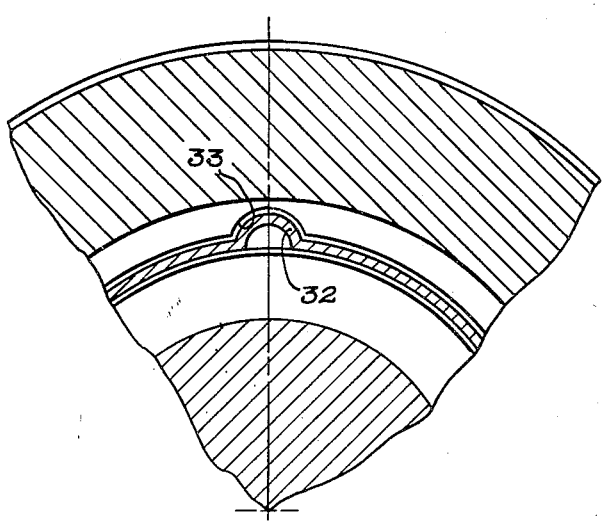

Fig. 1 is a section through a seal embodying this invention showing the seal installed in a fluid-handling apparatus; and Fig. 2 is a fragmentary elevation taken along line 2—2 of Fig. 1.

Referring to the drawings, there is shown a shaft 10 which passes through and is supported by a bearing 11 mounted in a housing 12, said housing having an annular rib 13 extending axially from the wall 14 thereof and having a ground or otherwise smoothly finished radially disposed sealing surface 15 thereon. Cooperating with surface 15 is a washer 16 having a similar axially extending annular rib 17 which is provided with a radially disposed ground or otherwise suitably smoothly finished sealing surface 18 thereon, said surface 18 abutting on surface 15 to form a fluid-tight seal therebetween.

Said washer 16 is telescoped over a cylindrical wall 19 of a retainer 20 having a radially disposed wall 21 at the right-hand end (Fig. 1) of cylindrical wall 19. Said retainer 20 is preferably made of a rigid material such as brass or the like and washer 16 is preferably made of a thermosetting resin containing a powdered alloy of antimony, tin and lead. Housing 12 is normally made of cast iron and it has been found that the resin material of washer 16 operates very well against cast iron. It is understood, however, that the material of both the housing and washer may be varied to suit the particular requirements of the fluid handled.

Retainer 20 fits into a recess 22 formed in the hub 23 of a pump impeller or the like, said hub being press-fitted on shaft 10 so as to form a fluid-tight joint therewith. The recess 22 terminates in a radially disposed wall 24 against which radial wall 21 of the retainer abuts. The radial dimension of recess 22 is greater than the radial dimension of wall 21 plus the thickness of cylindrical wall 19 so that retainer 20 is loose in recess 22. To prevent relative rotation between retainer 20 and hub 23, said hub 23 is provided with one or more blind holes 25 into which project bosses 26 formed in radial wall 21 of retainer 20. Said bosses 26 fit loosely in blind holes 25 so that it is not necessary to press the bosses into the holes.

Washer 16 is sealed with respect to hub 23 by means of an endless ring 27 of resilient deformable material such as rubber or the like, said ring 27 having a circular radial cross-section. Such rings are readily available in the open market and are commonly known as O rings. Ring 27 is compressed between a cylindrical surface 28 on washer 16 and the interior cylindrical surface of recess 22 so as to form a fluid-tight joint therebetween. A radially disposed flange 29 on washer 16 confines ring 27 on one side and a rigid washer 30 abutting on the back of sealing washer 16 confines ring 25 on the other side. Sufficient axial space is provided between flange 29 and washer 30 to permit ring 27 to roll with respect to washer 16 when said washer is moved axially in recess 22.

Washer 16 is held in contact with housing 12 by means of a spring 31, shown for purposes of illustration as a conical spring, which is compressed between radial wall 21 of retainer 20 and washer 30. Said spring 31 provides a continuous axial pressure which is utilized to maintain surfaces 18 and 15 in fluid-tight relation. It is understood, of course, that where the size of the seal does not permit the use of a single spring such as 31, a plurality of small helical springs may be used in the space between washer 30 and wall 21.

Washer 16 is prevented from rotating relative to retainer 20 by means of one or more lugs 32 formed in wall 19 and extending into notches 33 formed in the interior surface of washer 16. The seal is made self-contained by turning up a flange 34 in the left-hand end (Fig. 1) of cylindrical wall 19 after the seal has been assembled. Said flange 34 overlaps the interior surface 35 of ring 16 and therefore prevents said ring from leaving cylindrical wall 19.

The seal above described is assembled by placing a spring 31 into retainer 20, following which a washer 30 and a sealing washer 16 is slid over cylindrical surface 19 with the lugs 32 aligned with notches 33. Washer 30 is similarly notched at 36 to permit it to be assembled over lugs 32. Washer 16 is then held in retainer 20 while flange 34 is turned up. A ring 27 is stretched over flange 29 of washer 16 and dropped upon cylindrical surface 28 on washer 16. Alternatively, ring 27 may be assembled on washer 16 before said washer is assembled with respect to retainer 20 so as to avoid any possible injury either to the ring or the flange 29 of the washer.

After the seal is assembled into a unitary whole it may be assembled with respect to pump impeller 23 merely by slipping it into recess 22 and pressing upon washer 16 to overcome the friction produced by the compression of ring 27 between the washer and recess.

It is apparent that the seal just described will perform the functions of the aforementioned Voytech seal and does not require that the retainer be pressed into a housing or retained therein by the force of friction provided between a cylindrical surface on the retainer and the cylindrical wall of a recess. It will also be observed that no outer cylindrical wall is necessary and hence the retainer 20 will be somewhat less expensive to make. Should it be necessary to remove and replace the seal, no great force is necessary since only the friction of the ring 27 need be overcome.

It is understood that the foregoing description is illustrative of preferred embodiments of this invention and that the scope of the invention is not to be limited thereto, but is to be determined by the appended claims.

What is claimed is:

1. In a device for effecting a fluid-tight seal between relatively rotatable machine elements, said device having a sealing washer of rigid anti-friction material, a ring of resilient deformable material compressed between the washer and one of the elements for effecting a fluid-tight seal between the washer and the said one of the elements, a rigid unitary sheet metal retainer having a cylindrical wall telescoped within the washer and a radial wall extending from one end of the cylindrical wall, and conical spring means compressed between the radial wall and washer, the improvement which comprises bosses formed in the radial wall, said one element having recesses to receive the bosses with a loose fit to prevent relative rotation therebetween, and lugs on the cylindrical wall, said washer having notches to receive the lugs to prevent relative rotation between the washer and retainer.

2. A device for effecting a fluid-tight seal between relatively rotatable machine elements one of which elements has an annular recess facing the other element, said device comprising a sealing washer of rigid anti-friction material, a ring of resilient deformable material compressed radially between the washer and a wall of the recess and supporting the washer in the recess, a unitary sheet metal retainer fitting loosely in the recess and having a cylindrical wall telescoping into the washer, and a radial wall at one end of the cylindrical wall, conical spring means compressed between the washer and radial wall, bosses on the radial wall, said one element having holes to receive the bosses to prevent relative rotation between the retainer and said one element, and means on the cylindrical wall for preventing relative rotation between the retainer and washer.

SHIRREL A. HASTINGS.
JAMES H. THAYER.

REFERENCES CITED

The following references are of record in the file of this patent:

UNITED STATES PATENTS

| Number | Name | Date |
|---|---|---|
| 2,076,716 | Fretter | Apr. 13, 1937 |
| 2,301,723 | Vedovell | Nov. 10, 1942 |
| 2,405,464 | Storer | Aug. 6, 1946 |
| 2,414,600 | Land et al. | Jan. 21, 1947 |